[19] United States Patent  [15] 3,695,744
Clay  [45] Oct. 3, 1972

[54] HOLOGRAPHIC MULTICOLOR TECHNIQUE

[72] Inventor: Burton Ross Clay, Wayland, Mass.
[73] Assignee: RCA Corporation
[22] Filed: Jan. 14, 1971
[21] Appl. No.: 106,485

[52] U.S. Cl. ............350/3.5, 178/5.4 R, 178/5.4 E, 350/162 SF
[51] Int. Cl. ...........................................G02b 27/00
[58] Field of Search.......350/3.5, 162 SF; 178/6, 6.5, 178/5.4 R, 5.4 E

[56] References Cited

UNITED STATES PATENTS 3,580,655  5/1971  Leith et al. ..................350/3.5
3,488,101  1/1970  Van Ligten et al.........350/3.5

OTHER PUBLICATIONS

Van Ligten et al., Jour. of Applied Physics, Vol. 38, March 1967, pp. 1,994–1,996.
Brandt et al., Physics Letters, Vol. 25A, No. 2, July 1967, pp. 68–69.

Primary Examiner—David Schonberg
Assistant Examiner—Ronald J. Stern
Attorney—Edward J. Norton

[57] ABSTRACT

By successively recording a plurality of surface holograms, each of which manifests a different color component of any multicolor scene, on the same area of a recording medium, the multicolor scene is recorded in holographic form without any undesirable interaction among the various recorded holograms. This is accomplished by choosing a different meridional angle with respect to the recording medium for each separate hologram. During playback, by simultaneously illuminating the recorded multicolor scene in holographic form with separate beams of light, which need not be coherent, each of which corresponds in color to the color manifested by a different one of the plurality of recorded holograms, a multicolored image of the recorded scene is reconstructed. This is accomplished by angularly orienting each of the colored beams of light with respect to the recording medium in correspondence with the meridional angle of the one of the plurality of holograms manifesting that color.

5 Claims, 8 Drawing Figures

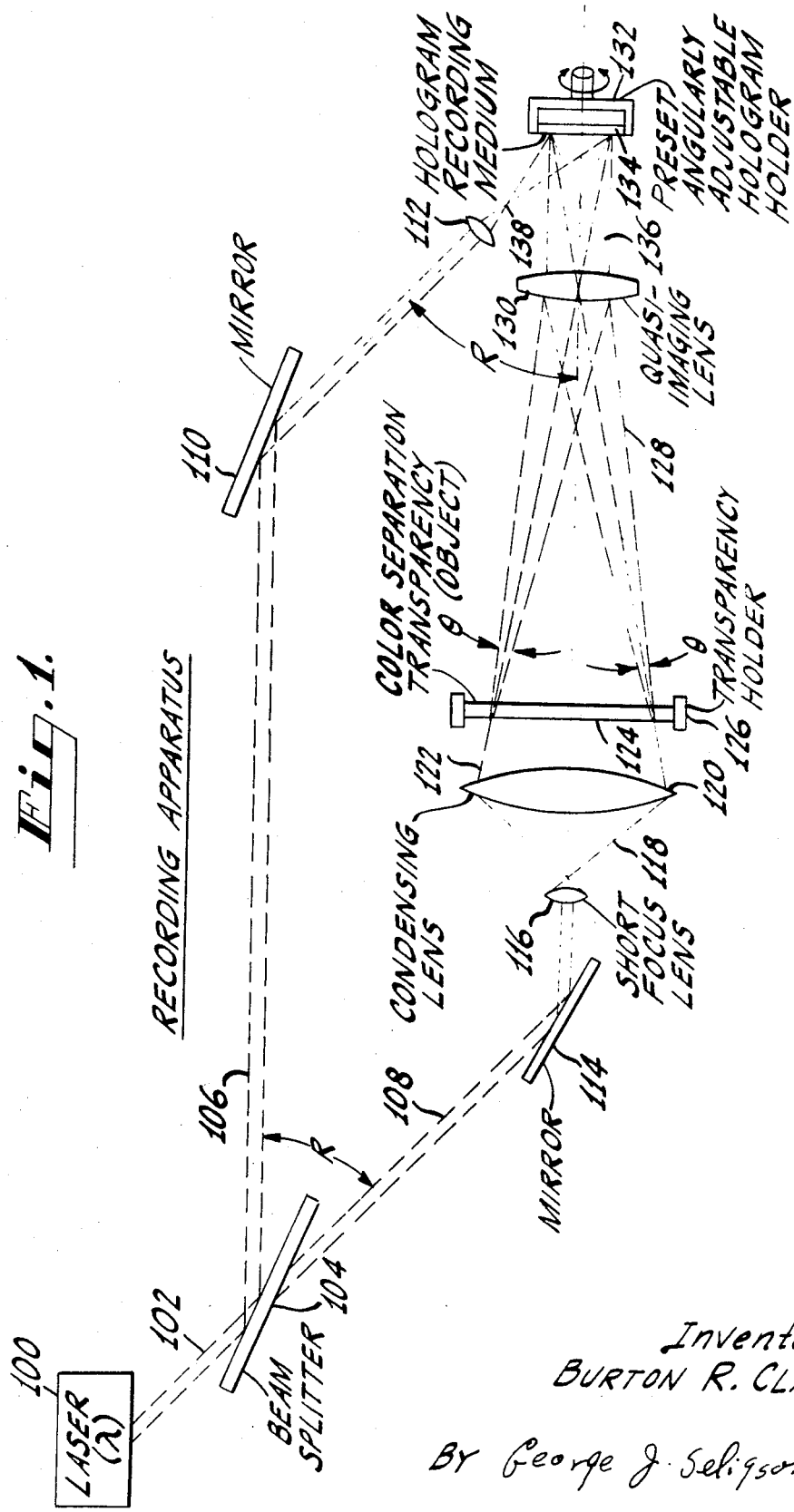

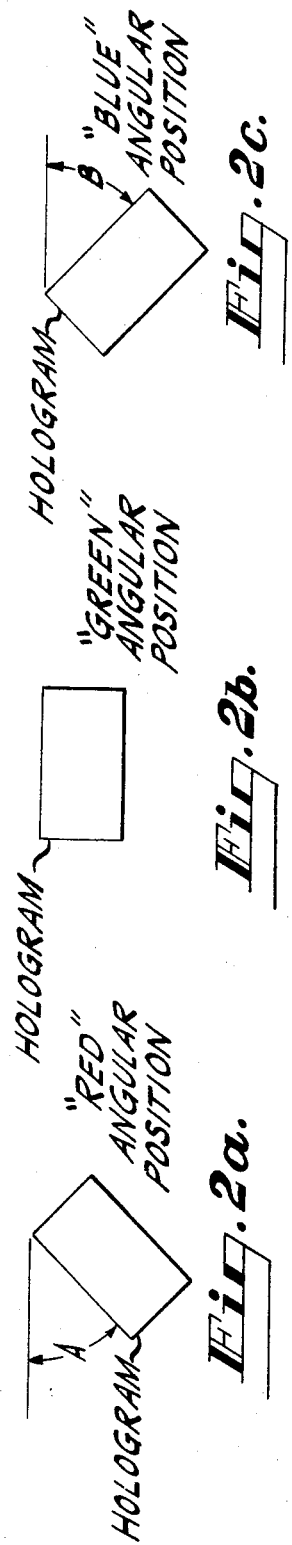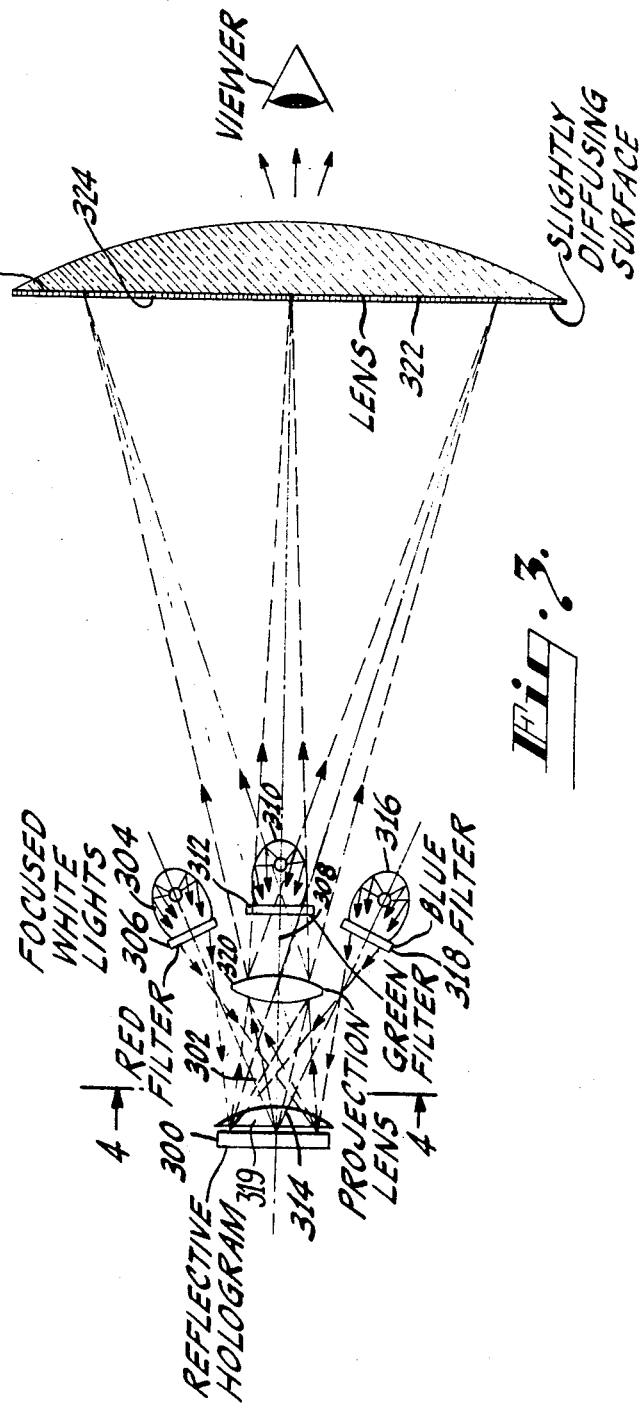

Inventor:
BURTON R. CLAY
By George J. Seligsohn
Attorney

HOLOGRAPHIC MULTICOLOR TECHNIQUE

The invention herein described was made in the course of or under a contract or subcontract thereunder with the Department of the Navy.

The present invention relates to techniques for recording or playing back holograms manifesting a multicolored scene and, more particularly, to such techniques employing a plurality of overlapping surface holograms.

As is known, one or more holograms may be recorded on a given area of the surface of a recording medium to produce so-called thin or surface holograms, or, alternatively one or more holograms may be recorded within the recording medium to produce so-called thick or volume holograms. A technique is known for recording a plurality of volume holograms within the same volume of recording material, wherein each of these holograms manifests a different color component of a multicolor scene, and they playing back this volume recording to reconstruct a multicolor image of the recorded scene. However, the prior art does not suggest a technique for recording a plurality of surface holograms on the same area of a recording medium, wherein each of the holograms manifests a different color component of a multicolor scene, and then playing back this surface recording preferably with non-coherent light to reconstruct a multicolor image of the recorded scene.

A surface holographic recording has an important advantage over a volume holographic recording because it is readily accessible. Thus, a master surface holographic recording may be duplicated by photocopying, or (if it is in the form of a phase hologram) by casting or making a mold thereof and employing this mold for hot pressing. Such duplicating procedures are, of course, not available for volume holograms.

The term "multicolor scene", as used herein, includes all types of spatially distributed visual information which can be displayed in two or more different colors. Examples of such visual information are colored pictures, colored writings, color codes, etc.

For instance, one use to which the present invention is being put is to provide in an aircraft, for navigation purposes, a colored aerial map display (which is obtained from the reconstruction of surface holograms recorded in accordance with the principles of the present invention) of the area in the vicinity of the aircraft. Comparing the features of the ground over which the aircraft is actually flying with the displayed map information helps the pilot fly the proper course.

Briefly, in accordance with the recording technique of the present invention, a hologram recording medium is oriented in a first angular position in a given plane perpendicular to a given axis. Holographic recording means which are fixed in position with respect to the given plane and the given axis record a first surface hologram on the recording medium while in its first angular position. Further, the first surface hologram manifests one color component of any given multicolor scene. The medium is then rotated in the given plane about the given axis from its first angular position to a second angular position thereof which differs from the first angular position by other than 0 or 180°. Thus, the angular position of the medium with respect to the fixed position of the holographic recording means is altered. The fixed holographic recording means are then employed to record a second surface hologram on the recording medium while in its second angular position. Thus, the respective holograms are recorded on the same area of the recording medium, but their fringe fields are oriented at different predetermined meridional angles with respect to each other.

Further, in accordance with the present invention, multicolor scenes, recorded in accordance with the technique discussed in the last paragraph, may be played back by holding the recording medium in a predetermined position and then illuminating the area of the medium on which the holograms are recorded with incident light of one color which incident light of this one color arrives at an angle which corresponds with the meridional angle of the first hologram and which reconstructs an image of the scene in this one color in a given region of space with respect to the predetermined position. Simultaneously, this area of the medium is also illuminated with incident light of another color which incident light of the other color arrives at an angle which corresponds with the meridional angle of the second hologram and which reconstructs an image of the scene in this other color in the same given region of space with respect to the predetermined position that registers with the reconstructed image in the one color.

It is therefore on object of the present invention to record a multicolor scene in the form of surface holograms.

It is another object of the present invention to reconstruct an image of a multicolor scene recorded as surface holograms.

These and other features and advantages of the present invention will become more apparent from the following detailed description along with the accompanying drawings, in which:

FIG. 1 is a schematic diagram of an illustrative embodiment of recording apparatus employed to record a multicolor scene on a holographic recording medium in surface hologram form;

FIGS. 2a, 2b and 2c show an example of three possible different angular positions of the preset angularly adjustable hologram holder of FIG. 1;

FIG. 3 is a schematic diagram of an illustrative embodiment of readout apparatus for playing back a reflective hologram recorded in accordance with the principles of this invention;

Figure 6:
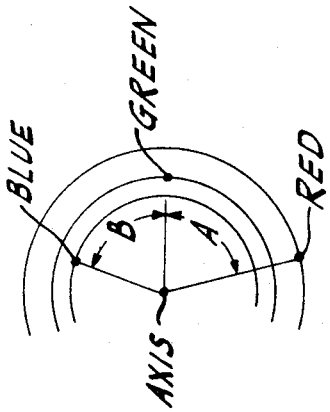
FIG. 6 shows the orientation of the blue, green and red beams of FIG. 5 in plane 6—6 of FIG. 5.

The recording apparatus shown in FIG. 1 comprises laser 100, which emits a beam of coherent light at a given wavelength $\lambda$. For instance, laser 100 may be a He-Cd laser and $\lambda$ may be the blue light emitted thereby. Beam 102 is incident on beam splitter 104, which may be a partially reflecting mirror, which splits beam 102 into first component 106 reflected therefrom and second component 108 transmitted therethrough. First component 106, after reflection from mirror 110, is incident on convex lens 112. Second component 108, after reflection from mirror 114, is incident on short focus lens 116.

Emerging from short focus lens 116 is expanded beam 118, which is incident on condensing lens 120. Convergent light beam 122, emerging from condensing lens 120, is spatially modulated in intensity by the information on a color separation transparency 124, which is supported by transparency holder 126. In addition, to intensity modulating the light passing through transparency 124, the spatial information on transparency 124 diffracts the light passing therethrough by an amount which depends upon the values of the spatial frequency components of the spatial information. In particular, the highest spatial frequency component, corresponding to the smallest bit size (highest resolution) of the spatial information on transparency 124 results in portions of intensity-modulated light beam 128 corresponding to these higher spatial frequency components being diffracted by an angle $\theta$.

Quasi-imaging lens 130, which is a convex lens having a predetermined focal length and a predetermined width, or aperture, is located, as shown, in coaxial relationship with lenses 116 and 120 and transparency 124 and transparency holder 126, at a given distance from transparency 124. This given distance, which is the effective object distance of quasi-imaging lens 130, is selected so that the aperture of lens 130 subtends the diffraction angle $\theta$, as shown. In this manner, portions of intensity-modulated beam 128, modulated by each separate spatial information point of transparency 124, illuminates the entire aperture of lens 130, without the need for any additional optics therebetween.

Located a certain distance on the other side of lens 130, in coaxial relationship therewith, is hologram holder 132, which supports hologram recording medium 134. Further, hologram holder 132 is rotatable about its axis to permit holder 132 to be adjusted to any one of a plurality of different preset angular positions. The meridional angle of medium 134 is determined by the preset angular position to which holder 132 is adjusted.

Beam 128, after passing through lens 130, forms information component beam 136, which is incident on medium 134 with a spherical wavefront having a certain curvature. The focal length of lens 112 and the distance of lens 112 from medium 134 is chosen so that reference beam component 138 is incident on medium 134 with a spherical wavefront which has a curvature substantially equal to the aforesaid certain curvature of the incident wavefront of information component 136. Further, as shown, the mean direction of reference beam 138 is angularly offset from the mean direction of information component 136 by an angle of R.

Quasi-imaging lens 130 forms a real image of the scene depicted by transparency 124 in an image plane which is located a predetermined distance to the right of lens 130, and which depends upon the object distance between transparency 124 and lens 130 and the focal length of lens 130. The photosensitive surface of hologram recording medium 134 may be located in this image plane, in which case a focused image surface hologram of the scene defined by transparency 124 will be recorded thereon. However, for reasons to be discussed more fully below, the photosensitive surface of recording medium 134 preferably is spaced somewhat ahead or behind the image plane. It is for this reason that lens 130 is referred to as a "quasi-imaging" lens, rather than an "imaging" lens.

Considering now the operation of the recording apparatus shown in FIG. 1, it will be assumed solely for the purposes of this discussion that laser 100 is a He-Cd laser and that the wavelength of coherent light beam 102 is the characteristic blue wavelength of a He-Cd laser.

In operation, a first color separation transparency manifesting a first of the three primary additive colors, such as red, in a given multicolor scene is inserted in transparency holder 126, and hologram holder 132 is angularly adjusted to orient hologram recording medium 134 in a first preset angular position thereof, such as the angular position shown in FIG. 2a. Then, laser 100 is operated, either by means of a shutter (not shown) in laser 100 or by pulsing of laser 100, to emit beam 102 for a preselected short duration. During this short duration, the photosensitive surface of medium 134 is simultaneously exposed to information component beam 136 and reference component beam 138. These two beams interfere with each other at the photosensitive surface of hologram recording medium 134 to record a first hologram over a given area thereof. The length of the short duration is chosen to provide sufficient exposure time for the recording of this first hologram.

After the first hologram has been recorded, hologram holder 132 is rotated to a second preset angular position thereof, such as shown in FIG. 2b, and the first color separation transparency, employed in recording the red-manifesting first hologram, is removed from transparency holder 126 and is replaced at an angle in the plane perpendicular to the optical axis corresponding to the aforesaid second preset angle by a second color separation transparency manifesting a second primary additive color component, such as green, of the same multicolor scene. A second hologram is then recorded in the same manner as described above in connection with the first hologram. It will be seen that the first and second holograms are recorded on substantially the same area of medium 134, but at different meridional angles of the photosensitive surface of medium 134. In particular, as shown in FIGS. 2a and 2b, the difference in the meridional angle between the first hologram, which manifests the red color component of the multicolor scene, and the second hologram, which manifests the green color component of the multicolor scene, is A.

After the second hologram has been recorded on medium 134, holder 132 along with medium 134 is rotated to a third preset angular position thereof, such as shown in FIG. 2c, and a third color separation transparency manifesting a third primary additive color component, such as blue, of the same multicolor scene, at the third preset angle replaces the second color separation transparency, employed in recording the green-manifesting second hologram, in transparency holder 126. Then a third hologram is recorded on substantially the same given area of the photosensitive surface of medium 134. As shown in FIG. 2c, the meridional angle of this third hologram differs from the meridional angle of the second hologram by the angle B and differs from the meridional angle of the first hologram by the angle (A + B).

In the embodiment shown, the plurality of overlapping surface holograms recorded at different meridional angles with respect to each other is three. However, the plurality of recorded holograms may be only two or they may be even more than three. In any case, the meridional angle between any pair of recorded holograms is chosen to be other than 0°, or 180° to prevent spatial coincidence of corresponding diffraction orders upon reconstruction of the hologram. In fact, since in most cases the maximum angular deviation of any diffraction order obtained from the reconstruction of a surface hologram of the type described is about plus or minus 4° with respect to the mean direction thereof, it is desirable that the difference in meridional angle between any pair of recorded surface holograms be at least 10° and at most 170°, to prevent any overlap at all in the corresponding diffraction orders of any two holograms upon reconstruction. Furthermore, to prevent the derivation of spurious spatial frequencies having values substantially equal to information signal spatial frequencies, it is desirable that the difference in meridional angles between any one pair of recorded surface holograms be neither substantially equal to nor substantially an integral multiple of the difference in meridional angles between any other pair of recorded surface holograms. Thus, in the case of the three holograms shown in FIGS. 2a, 2b and 2c, the respective values of angle A, angle B, and angle (A + B) should preferably each be at least 10° and no greater than 170°. Further, none of these angles, preferably, should be the same or equal to integral (number of degrees) multiples of each other. For example, angle A might be 40° and angle B might be 50°.

The photosensitive surface of hologram recording medium 134 may be a conventional photographic silver emulsion or any other type of light sensitive medium having a resolving power sufficient to record a hologram. However, there is a particular benefit in employing a photoresist as the photosensitive surface of medium 134. In particular, a photoresist hologram recording medium, after exposure and development, manifests the recorded holograms thereon as relief pattern phase holograms, and is therefore useful as a master recording from which duplicate copies may be made either directly or indirectly by casting or hot pressing. The duplicate copies may be made either in a transmissive material, such as transparent vinyl, or in a reflective material, such as reflectively coated vinyl.

Figure 4:
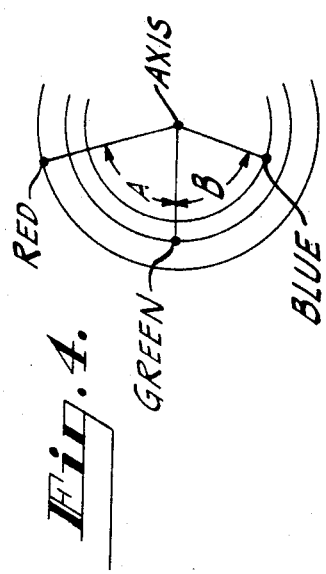
FIG. 4 shows the orientation of the red, green and blue light beams of FIG. 3 in plane 4—4 of FIG. 3.
Figure 5:
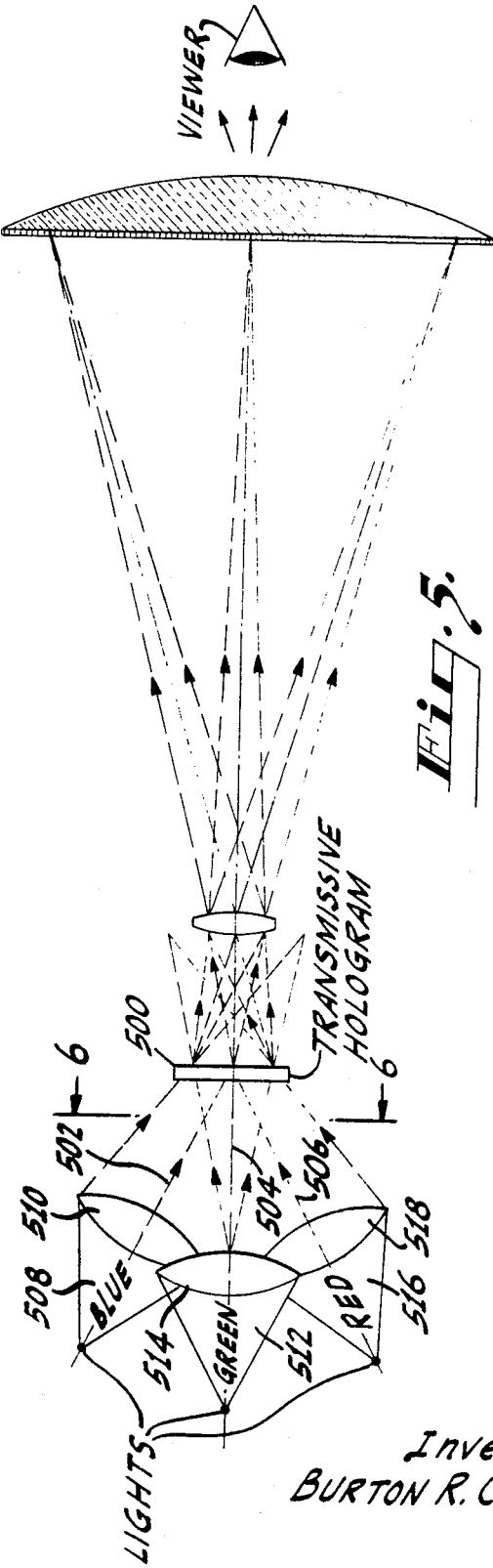
FIG. 5 is a schematic diagram of an illustrative embodiment of readout apparatus for playing back a transmissive hologram made in accordance with the principles of this invention.

FIGS. 3 and 4 show apparatus for reading out an appropriate reflective hologram originally recorded in the manner discussed in connection with FIGS. 1 and 2, while FIGS. 5 and 6 show apparatus for reading out a transmissive hologram also originally recorded in the manner described in connection with FIGS. 1 and 2. Before preceding further with a description of the playback apparatus, the desirability of "quasi-imaging" will be discussed.

The depth of focus $f_d$ of a lens is defined as follows:

$$f_d = \frac{1}{2}(f/A)^2 \lambda,$$

where $f$ is the vocal length of the lens, $A$ is the aperture of the lens, and $\lambda$ is the incident light wavelength.

As disclosed above, it is preferable that medium 134 in FIG. 1 be spaced somewhat from the image plane of quasi-imaging lens 130. The reason for this is that the lack of any redundancy in a focused image hologram means that, during playback, the hologram recording medium, which is normally made of vinyl or some other relatively soft material (and is therefore subject to scratches), will cause substantial loss of portions of the reconstructed image. On the other hand, by spacing medium 134 from the image plane of lens 130, a certain amount of redundancy results which mitigates the degradation of the reconstructed image due to scratches and dust on the hologram recording medium during playback. It has been found that the effective range of spacing distance between the image plane of lens 130 and the photosensitive surface of medium 134 extends up to 20 times the depth of focus $f_d$ of imaging lens 130, regardless of whether medium 134 is located on one side or the other of the imaging plane. The only price which must be paid for this redundancy is that the greater the value of this spacing distance, the more nearly monochromatic must be the incident light.

Referring now to FIG. 3, there is shown readout apparatus for a reflective hologram of the type recorded by the apparatus of FIG. 1, as mentioned above. More specifically, reflective hologram medium 300 is simultaneously illuminated by divergent beams of red, green and blue light, none of which need be coherent. As shown, beam 302 of red light is obtained from focused white light source 304 equipped with red filter 306. In a similar manner, green beam 308 is obtained from focused white light source 310 equipped with green filter 312 and blue beam 314 is obtained from focused white light source 316 equipped with blue filter 318. In practice, each of focused white light sources 304, 310 and 316 may be a compact high pressure Xenon arc in a sealed beam structure.

To provide the proper registration of all the color components in a reconstructed image of the multicolor scene, it is important that each of red beam 302, green beam 308 and blue beam 314 has the proper orientation with respect to reflective hologram medium 300 and, further, that the wavefront of each of these beams incident on reflective hologram medium 300 have the appropriate curvature. These requirements are met by situating reflective hologram 300 and each of the focused white light sources 304, 310 and 316, along with their respective filters 306, 312 and 318, in preselected fixed positions with respect to each other, in the following manner:

As discussed earlier in connection with FIG. 1, the recording of all the different holograms, regardless of the color component with which each one is associated, are recorded with coherent light of the same single wavelength, which, for the purposes of this discussion, has been assumed to be blue light from a He-Cd laser. Further, the angular separation R, between the mean direction of the information beam light component and the mean direction of the reference beam light component employed in recording each of the different holograms has the same value. Using a fixed reference beam angle R allows an economy of time, labor and apparatus complexity since no realignment is required between successive exposures. However, during playback the light employed is not only blue, as it was in recording the holograms, but includes red light and green light, in addition to blue light. It is therefore necessary to preset the mean angle of arrival of the various readout beams to compensate for their respective differences in mean wavelength compared to the wavelength of the coherent light employed in recording the holograms. For instance, if the angle R in FIG. 1 employed in recording the respective holograms was 15°, and the mean wavelength of blue readout beam 314 in FIG. 3 is substantially equal to the wavelength of the coherent light employed in recording the holograms, then the mean angle of blue readout beam 314 with respect to the normal to the surface of reflective hologram 300 should also be 15°. However, the corresponding angle for green readout beam 308 should be in the order of 18°, while the corresponding angle for red readout beam 302 should be in the order of 22°. The reason for this is that $\sin R_G = \sin R_B (\lambda_G/\lambda_B)$, and $\sin R_R = \sin R_B (\lambda_R/\lambda_B)$, where $R_B$, $R_G$ and $R_R$ represent the angles of the blue, green and red readout beams, respectively, and $\lambda_B$, $\lambda_G$ and $\lambda_R$ represent the wavelengths of the blue, green and red readout beams, respectively.

These relationships between the blue, green and red beams, discussed in the previous paragraph, are more clearly illustrated in FIG. 4, which shows the relationship between the mean direction of these beams in plane 4—4 (which is perpendicular to the plane of the paper). Further, shown in FIG. 4, is the fact that respective meridional angles of the red, green and blue beams are identical to the respective corresponding meridional angle of preset angularly adjustable hologram holder 132 in FIG. 1 employed during the recording of the red-manifesting, green-manifesting and blue-manifesting holograms, respectively.

The requirement that the curvature of the incident wavefront of each of readout beams 302, 308 and 314 in FIG. 3 be made substantially equal to the curvature of reference beam 138 in FIG. 1 is achieved by situating each of focused white light sources 304, 310 and 316 an appropriate predetermined distance from reflective hologram 300, which distance is determined by the focal length of each of these focused white light sources.

From the foregoing discussion, it is clear that elements 300, 304, 306, 310, 312, 316 and 318 of FIG. 3 are located in fixed predetermined relationship with respect to each other. In addition, a field lens 319 and a projection lens 320 are located at respective fixed distance (as shown) from reflective hologram medium 300 and in coaxial relationship therewith. The purpose of field lens 319 is to converge the diffracted light reflected from the hologram which would otherwise spread into a large cone that would require a large aperture projection lens 320. Thus, the use of field lens 319 permits a smaller aperture projection lens 320 to be employed.

The predetermined distance of projection lens 320 from reflective hologram medium 300 along with the focal length of projection lens 320 is chosen to project a focused image of the reconstructed multicolor scene, defined by the recorded holograms of reflective hologram 300, on the plane surface of lens 322, which is situated coaxially with respect to projection lens 320 a fixed distance on the other side thereof from reflective hologram medium 300, as shown. Lens 322 functions to give directionality to the screen comprising the slightly diffusing surface of the lens 324. It is, therefore, displayed to a viewer to the right thereof, as shown. Imparting favorable directionality to the light causes the image to appear brighter when viewed from a region defined by the direction of the emerging light. Thus, all components of the readout apparatus shown in FIG. 3 are in fixed, predetermined relationship with respect to each other. The readout apparatus for a transmissive hologram shown in FIG. 5, is, except for the fact that a transmissive rather than a reflective hologram medium is being read out, essentially the same as that discussed in connection with FIG. 3. In particular, the only differences are (1) the fact that transmissive hologram medium 500 is illuminated from the back by convergent blue light beam 502, green light beam 504 and red light beam 506 and (2) the field lens, as employed in FIG. 3, is not necessary. Blue light beam 502 is produced by a blue light source 508 incorporating a condensing lens 510 at the output thereof. In a similar manner, green light source 512 with condensing lens 514 produces green light beam 504 and red light source 516 with condensing lens 518 produces red light beam 506. The curvature of convergent light beams 502, 504 and 506 are the conjugates of divergent light beams 302, 308 and 314 in FIG. 3. Except for this difference, the relationships between the respective red, green and blue light beams are essentially the same as the relationship among the corresponding light beams of FIG. 3. In particular, FIG. 6, which shows the relationship among the red, green and blue light beams in the plane 6—6 (perpendicular to the paper) in FIG. 5, shows this relationship to be the mirror image of the relationship among the corresponding beams of FIG. 3 as shown in FIG. 4. In all other respects, the elements of FIG. 5 correspond identically to those of FIG. 3.

What is claimed is:

1. A holographic multicolor system for recording with a source of coherent light of the same given wavelength all of the component holograms of a composite redundant hologram which manifests a multicolor scene with a given resolution, said composite hologram on playback being illuminated with a plurality of non-coherent lights of different colors to reconstruct a multicolor image of said scene, said system comprising;
   a. a quasi-imaging lens disposed substantially symmetrically about a given axis for imaging an object located in an object plane thereof in an image plane thereof normal to said given axis, said quasi-imaging lens having a given depth of focus,
   b. means for disposing a recording medium normal to said given axis and located in a plane spaced a given distance from but substantially parallel to said image plane, said given distance being no greater than 20 times said given depth of focus so that a given area of said recording medium is illuminated by coherent light having a given curvature and having a direction substantially normal to said medium in response to an object in said object plane being illuminated by an object-illuminating beam of coherent light from said source, said recording medium being rotatable about said given axis to each of a plurality of different predetermined meridional angles situated in the plane thereof which individually correspond with each different color component of said multicolor scene, c. a reference beam lens responsive to the illumination thereof with a reference beam of said coherent light for illuminating said given area of said recording medium with coherent light having said given curvature and having a direction oblique to said medium, and d. illuminating means for illuminating in sequence said quasi-imaging lens with a different one of a plurality of object information beams of said coherent light each of which has been individually spatially modulated in accordance with a respective object in said object plane that manifests a different color component of said multicolor scene while said recording medium occupies that meridional angle which corresponds with that color component, and during each respective one of said sequential illuminations said illuminating means also simultaneously illuminating said reference beam lens with said reference beam of said coherent light.

2. The system defined in claim 1, said medium disposing means including a preset angularly adjustable hologram holder for supporting said recording medium in said plane thereof, said holder being rotatable about said given axis for adjusting said recording medium to at least first, second and third different predetermined meridional angular positions in the plane of said medium any two of which differ by an amount intermediate 0 and 180°, and wherein each of said first, second and third different predetermined meridional angular positions individually corresponds to a different one of the three primary additive colors of said multicolor scene.

3. The system defined in claim 2, wherein any one of said predetermined angular positions differs by at least 10° and at most 170° from any other of said predetermined angular positions, and the lowest common denominator of the ratio of the differences between any one pair of said predetermined angular positions and between any other pair of said predetermined angular positions is greater than unity.

4. The system defined in claim 2, wherein said illuminating means includes a separate color separation transparency corresponding to each primary additive color which when inserted in the object plane of said quasi-imaging lens and illuminated by said coherent light forms said object-information beam corresponding to that color.

5. The system defined in claim 1, wherein said quasi-imaging lens has a given aperture, and wherein the size of the smallest information bit of any of said objects manifesting respectively the different color components of said multicolor scene with respect to said given wavelength diffracts said coherent light by no more than a given diffraction angle, said given aperture substantially subtending said given diffraction angle.

* * * * *